March 23, 1965   J. P. ECHTLER, JR., ETAL   3,174,332
TEST COUPON POSITIONER
Filed April 4, 1961

INVENTORS
JOSEPH P. ECHTLER JR.
GEORGE R. RUTLEDGE
BY
THEIR ATTORNEY

United States Patent Office 3,174,332
Patented Mar. 23, 1965

3,174,332
TEST COUPON POSITIONER
Joseph P. Echtler, Jr., Bridgeville, and George R. Rutledge, Library, Pa., assignors to Consolidation Coal Company, Pittsburgh, Pa., a corporation of Pennsylvania
Filed Apr. 4, 1961, Ser. No. 100,664
5 Claims. (Cl. 73—86)

This invention relates to a test coupon positioner and more particularly to a positioning device for inserting into and removing from a pressure vessel an object in order to periodically examine the object to determine the effect of the material within the pressure vessel on the object.

In many processes which occur within closed pressure vessels, it is desirable to be able to periodically insert test objects into the pressure vessel to determine the effect of the process within the vessel on the object so inserted. One such process, presented here for example and not by way of limitation, is the pumping of a coal slurry within a pipeline. It has been found that the pumping of coal in a coal-water slurry through a pipeline has some corrosive and erosive effect upon the inner wall of the pipeline. In order to improve the type of steel used for such pipelines, it has been determined that testing of a great many samples of various types of steel within the pipeline itself is desirable. To perform these tests, small samples of the steel, termed "coupons," are placed within the line for predetermined lengths of time in order to microscopically check the coupons for indications of corrosion or erosion.

In order to perform realistic tests on the steel sample coupons, it is desirable to place the coupons within an actual slurry pipeline so that the test conditions will be most realistic. In order to insert these coupons into a coal slurry pipeline, it is impractical to shut down the pipeline and relieve the pressure within the pipeline each time it is desired to insert or remove a coupon. Accordingly, the present invention is directed to a device by which sample coupons may be inserted into a coal pipeline which coal slurry is flowing under pressure within the line. The coupons so positioned may remain within the line for predetermined periods of time and then be removed from the line without interrupting the flow through the line.

The present invention contemplates a coupon inlet conduit formed upon the pressure vessel and permanently remaining a part of the pressure vessel. The inlet conduit is valved so that it may be closed to prevent escape of material from within the pressure vessel. A coupon positioning device is provided to pass reciprocally through the valved inlet conduit and position the coupon within the pressure vessel. A separate drive means is provided to move the coupon positioning device and to protect the operator from high pressure fluid from within the pressure vessel during movement of the coupon positioner. The drive means is a separate unit which may be removed from the coupon inlet conduit after the coupon has been inserted. The drive means may then be used at other locations to either remove or insert additional coupons.

With the foregoing considerations in mind, it is a primary object of the present invention to provide an improved test coupon positioner.

Another object of this invention is to provide a test coupon positioning device for positioning an object within a pressure vessel without substantial loss of pressure therefrom.

Another object of this invention is to provide a coupon positioning device having a separable drive means in which the coupon may be positioned and left within the pressure vessel while the drive means is utilized elsewhere.

These and other objects of this invention will become apparent as this description proceeds in conjunction with the accompanying drawings.

Figures 1, 2, 3:
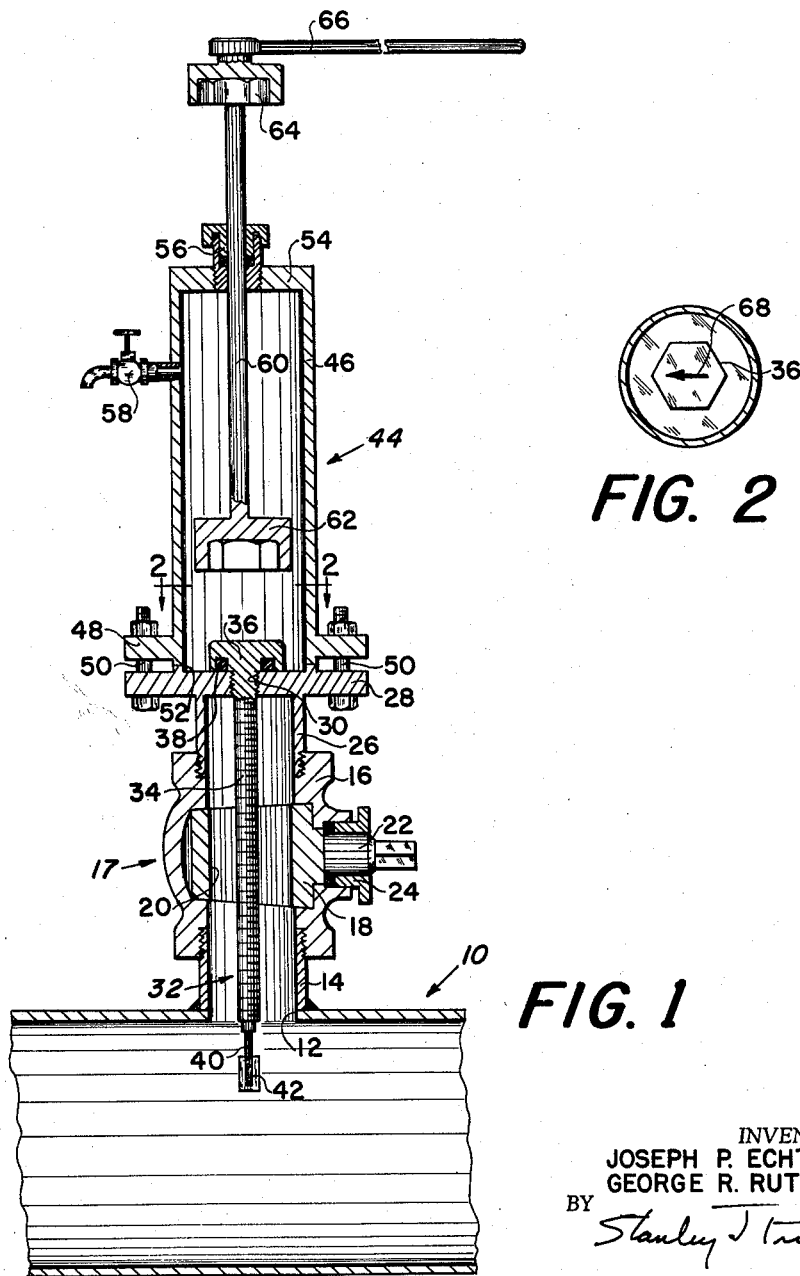
FIGURE 1 is an elevational view, in vertical section, of the test coupon positioner of the present invention.
FIGURE 2 is a cross sectional view taken along the line 2—2 of FIGURE 1 showing the top of the coupon positioner head portion.
FIGURE 3 is a top plan view of the wrench utilized on the positioner drive means.

Referring to the drawings, a pressure vessel or pipeline 10 has an inlet passage 12 formed in the wall thereof. A coupon inlet conduit section 14 is fixed to the wall of the pressure vessel, as by welding, to communicate with the inlet passage 12. Conduit section 14 is threaded into the body 16 of a conventional plug valve 17. The plug valve 17 is conventional in all respects and has a valve plug 18 through which is formed a flow passage 20. The valve plug 18 is preferably of the full opening type in which the flow passage 20 has a cross sectional area and shape corresponding to the interior passage within conduit section 14. In conventional manner, the valve plug 18 may be rotated by a valve plug stem 22 from the position shown in FIGURE 1 where the valve is open, to a position 90° removed from that shown in FIGURE 1 where the plug 18 would completely close the conduit section 14. The valve stem 22 extends out of housing 18 through a packing gland 24 and may be rotated by affixing a valve rotating handle (not shown) to the stem 22 to facilitate rotation.

Also threaded into plug valve body 16 is a second coupon inlet conduit section 26 having a blind flange 28 formed on the end thereof. The inlet conduit sections 14 and 26 together with the flow passage 20 within valve plug 18 are in coaxial alignment with each other to form a coupon inlet conduit. The blind flange 28 extends across the end of conduit section 26 and has a tapped bore 30 formed therein. Tapped bore 30 is coaxial with the passages in inlet conduit sections 14 and 26.

The tapped bore 30 is provided to receive a coupon positioner 32 having a threaded shank 34 and a head portion 36. By rotation of coupon positioner 32, the positioner may be reciprocally moved relative to the blind flange 28 through tapped bore 30. Formed on the lower side of the positioner head portion 36 is a seal means 38 which may sealingly connect the head portion 36 to the blind flange 28 when the positioner 32 is completely threaded through bore 30 until the head portion 36 abuts flange 82.

At the lower end of the positioner shank 34 a coupon receiving portion 40 is formed on positioner 32. The coupon receiving portion 40 rigidly supports a test coupon 42 as shown in FIGURE 1.

In order to thread positioner 32 through bore 30 a drive assembly 44 is provided. Drive assembly 44 includes a drive housing 46 having a flange 48 formed thereon. Flange 48 is adapted to be bolted to the blind flange 28 on inlet conduit section 26 by bolts 50. When bolted in place on the inlet conduit section 26, housing 46 sealingly engages the blind flange at 52.

On the upper end of housing 46, a housing end wall 54 is adapted to receive a packing gland 56. The housing 46 also has a vent valve 58 attached thereto to permit the interior of housing 46 to be vented to the atmosphere.

A drive shaft 60 having a socket 62 formed at one end and a head portion 64 affixed to the other end is slidingly, rotatably and sealingly received within the packing gland 56 so that a drive shaft 60 is free to reciprocate relative to the housing 46 and also free to rotate relative to housing 46. The socket 62 of drive shaft 60 registers with the head portion 36 of the coupon positioner 32 to enable the positioner 32 to be rotated by drive transmitted through shaft 60. A wrench 66 may be affixed to the head 64 to facilitate turning of the drive shaft 60.

In order to be able to properly position the relatively flat coupon 42, the positioner head 36 has an indicator 68 formed thereon so that by observing indicator 68 the direction in which the coupon 42 is aligned may be ascertained. Likewise, the wrench 66 has an indicator 70 formed thereon so that indicator 70 may be aligned with indicator 68 to indicate to one observing indicator 70 the relative position of indicator 68 and, therefore, the relative position of coupon 42.

To insert a test coupon into a pressure vessel the device of the present invention may be operated as follows. Initially, the pressure vessel is equipped with the inlet conduit sections 14 and 26 and the plug valve 17 having housing 16 and plug 18. The plug 18 is in a closed position 90° from that shown in FIGURE 1.

To insert a test coupon 42, the positioner 32 is first threaded into bore 30 until the coupon 42 is within the inlet conduit section 26 but above the valve body 16. Because of the indicator 68, the direction in which the flat coupon 42 is turned may be ascertained although the coupon itself may not be seen. The housing 46 is then placed over the positioner 32 and the socket of drive shaft 60 is positioned to register with the head portion 36 of positioner 32. The socket is positioned so that indicator 70 on wrench 66 is aligned with indicator 68 on positioner head 36. With the socket 62 in registering relation with the head portion 36, the housing 46 is securely bolted to blind flange 28 to for a seal at 52.

Once the housing 46 is in position, the valve plug 18 may be rotated to open the inlet conduit by permitting passage 20 within plug 18 to register with the passages within inlet conduit sections 14 and 26. When the plug valve 17 is opened, a small amount of high pressure fluid may escape through bore 30 around the threads of positioner 32. The housing 46 will prevent this high pressure fluid from striking the operator who is inserting the test coupon.

By turning wrench 66, drive is transmitted to the positioner 32 and positioner 32 is rotated and thereby threaded into blind flange 28 through bore 30 until coupon 42 enters the pressure vessel as shown in FIGURE 1. When the coupon enters the pressure vessel, the positioner head portion 36 contacts blind flange 28 and a seal is created between the head portion 36 and flange 28 by sealing means 38. Because the test coupon is essentially a flat piece of metal, it is desirable to know in which direction it is located in the pipeline relative to the flowing stream within the pipeline 10. Accordngly, the indicator 70 on wrench 66 may be positioned in any position in which it is desired to have coupon 42 positioned within the pipeline 10.

Once the coupon 42 has entered the pipeline 10, and head portion 36 has sealingly contacted flange 28, no further leakage can occur through bore 30. Accordingly, the drive assembly 44 including housing 46 and drive shaft 50 may be removed from blind flange 28 and utilized in another location. Before breaking the seal between housing 46 and flange 28 to remove the housing assembly 44, the vent valve 58 is opened to insure that any high pressure which may have built up within housing 46 is vented to atmosphere. The coupon 42 may be retained within the pipeline for so long as desired for an adequate test.

When it is desired to remove the test coupon 42 from pipeline 10, the procedure is essentially reversed. The drive housing 46 is bolted to the flange 28, the socket 62 is caused to register with head portion 36 so that positioner 32 may be unthreaded from bore 30, and upon test coupon 42 being retracted past the valve body 16, the valve plug 18 is rotated to the closed position. The vent valve 58 may then be opened and the drive housing 46 and the positioner 32 may then be removed and the test coupon 42 examined.

As described thus far, it has been assumed that the test coupon 42 is small enough to pass freely through the bore 30 in blind flange 28. It is possible to utilize the present device with a larger coupon 42 which may not pass through the bore 30 in flange 28. When utilized with a larger test coupon 42, the procedure for inserting the coupon is as follows. With the valve plug 18 in the closed position, conduit section 26 is unthreaded from the valve body 16. The positioner 32 is then threaded partially through the flange 28 before the coupon 42 is affixed thereto. Once the coupon receiving portion 40 passes through the blind flange 28, the enlarged coupon 42 is secured to the coupon receiving portion 40 within the conduit section 26. The conduit section 26 is then threaded back into the valve body 16 whereby the coupon is within the conduit section 26 above the valve plug 18. Proceeding then, as before, the socket 62 is made to register with head portion 36, the housing 46 is bolted to the flange 48, the plug valve 17 is opened, and the positioner 32 is threaded down into the inlet conduit until coupon 42 is with the pipeline 10.

In order to remove the enlarged coupon, the steps are reversed until the enlarged coupon is within the conduit section 26 above valve plug 18. At that time, the valve plug 18 is rotated to the closed position and the conduit section 26 is unthreaded from the valve body 16. The enlarged coupon 42 is then exposed and may be removed from the positioner 32.

With the present invention, a test coupon or other object may be inserted into and removed from a pressure vessel without substantial loss of pressure in the vessel and in a completely safe manner. The high pressure process within the vessel need not be interrupted in order to insert the test coupon with the present device.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. Apparatus for inserting an object into a pressure vessel comprising an inlet conduit fixedly secured to said vessel and communicating with the interior of said vessel, positioning means having said object secured thereto and supported for movement through said inlet conduit to position said object within said pressure vessel, seal means to sealingly engage said positioning means and said inlet conduit to each other when said object is positioned within said pressure vessel, removable drive means operable to move said positioning means through said inlet conduit, said drive means including a housing removably and sealingly securable on said inlet conduit and having a drive shaft slidingly and sealingly supported therein whereby said shaft is operable to removably register with said positioning means and to move said positioning means through said inlet conduit to position said object within said conduit, and valve means in said inlet conduit, said valve means operable to close said inlet conduit upon removal of said positioning means therefrom.

2. Apparatus for inserting a test coupon into a pressure vessel comprising an inlet conduit having an outer end portion and an inner end fixed to the wall of said pressure vessel to communicate with the interior of said vessel, valve means in said inlet conduit operable to open or close said conduit, a receiving wall formed on said inlet conduit outer end portion, coupon positioning means having said coupon secured thereto and supported by said receiving wall for movement through said inlet conduit and said valve means to position said coupon within said pressure vessel, said valve means operable to close said inlet conduit upon removal of said coupon positioning means therefrom, seal means to sealingly engage said coupon positioning means and said receiving wall to each other when said coupon is in position within said pressure vessel, and removable drive means operable to move said coupon positioning means through said inlet conduit and valve means, said drive means including a housing removably and sealingly securable on said inlet conduit and having a drive shaft slidingly and sealingly supported therein, said drive shaft operable to removably register with said positioning means and to move said coupon positioning means from a position substantially within said housing to a position substantially within said inlet conduit and to return said coupon positioning means to a position substantially within said housing as desired, said housing preventing leakage from said pressure vessel from reaching the exterior of said housing as said coupon positioning means is moved.

3. Apparatus for inserting a test coupon into a pressure vessel comprising an inlet conduit having an outer end portion and an inner end fixed to the wall of said pressure vessel to communicate with the interior of said vessel, valve means in said inlet conduit operable to open or close said conduit, a receiving wall formed on said inlet conduit outer end portion and having a threaded bore therethrough, a coupon positioning means having a head portion and a threaded shank portion with said coupon secured thereto, said coupon positioning means threadingly received within said receiving wall bore and movable through said inlet conduit and said valve means upon rotation to position said coupon within said pressure vessel, seal means cooperating to seal said coupon positioning means head portion and said receiving wall to each other when said coupon is in position within said vessel, and removable drive means operable to move said coupon positioning means through said inlet conduit and said valve means, said valve means operable to close said inlet conduit upon removal of said coupon positioning means therefrom, said drive means including a housing removably and sealingly securable on said inlet conduit and having a drive shaft slidingly and sealingly supported therein, said drive shaft having a socket formed thereon removably engageable to said coupon positioning means head portion whereby said drive shaft is operable to rotate said coupon positioning means from a position where said coupon is outside said inlet conduit valve to a position where said coupon passes through said valve and is positioned within said pressure vessel, said drive shaft also being selectively operable to rotate said coupon positioning means to withdraw said coupon from said pressure vessel, said housing preventing leakage from said pressure vessel from reaching the exterior of said housing as said coupon positioning means is moved.

4. The apparatus of claim 3 wherein first indicating means is formed on said coupon positioning means head portion to indicate the position of said coupon and second indicating means is formed on said drive shaft whereby said drive shaft position may be coordinated with said coupon position for positioning said coupon at a desired position within said pressure vessel.

5. Apparatus for inserting a test coupon into a pressure vessel comprising an inlet conduit having an outer end portion and an inner end fixed to the wall of said pressure vessel to communicate with the interior of said vessel, valve means in said inlet conduit operable to open or close said conduit, a receiving wall formed on said inlet conduit outer end portion and having a threaded bore therethrough, a coupon positioning means having a head portion and a threaded shank portion with said coupon secured thereto, said coupon positioning means threadingly received within said receiving wall bore and movable through said inlet conduit and said valve means upon rotation to position said coupon within said pressure vessel, seal means cooperating to seal said coupon positioning means head portion and said receiving wall to each other when said coupon is in position within said vessel and said head portion is contiguous to said receiving wall, and removable drive means operable to move said coupon positioning means through said inlet conduit and said valve means, said valve means operable to close said inlet conduit upon removal of said coupon positioning means therefrom, said drive means including a housing removably and sealingly securable on said inlet conduit and having a drive shaft slidingly and sealingly supported therein, said housing having a vent valve secured thereto operable to vent the interior of said housing to atmosphere, said drive shaft having a socket formed thereon removably engageable to said coupon positioning means head portion within said housing whereby said drive shaft is operable to rotate said coupon positioning means from a position where said coupon is outside said inlet conduit valve to a position where said coupon passes through said valve and is positioned within said pressure vessel, said drive shaft also being selectively operable to rotate said coupon positioning means to withdraw said coupon from said pressure vessel, said housing adapted to protect persons rotating said drive shaft from being contacted with high pressure leakage from within said pressure vessel as said coupon positioning means is moved.

References Cited in the file of this patent

UNITED STATES PATENTS

| | | |
|---|---|---|
| 249,526 | Hubbell | Nov. 15, 1881 |
| 1,683,489 | Rice | Sept. 4, 1928 |
| 1,736,561 | Wattel | Nov. 19, 1929 |
| 2,870,629 | Willis | Jan. 27, 1959 |
| 3,007,340 | Kraftson | Nov. 7, 1961 |